No. 802,020. PATENTED OCT. 17, 1905.
J. PATTEN.
FOG DISTANCE SIGNALING METHOD.
APPLICATION FILED MAY 22, 1903.

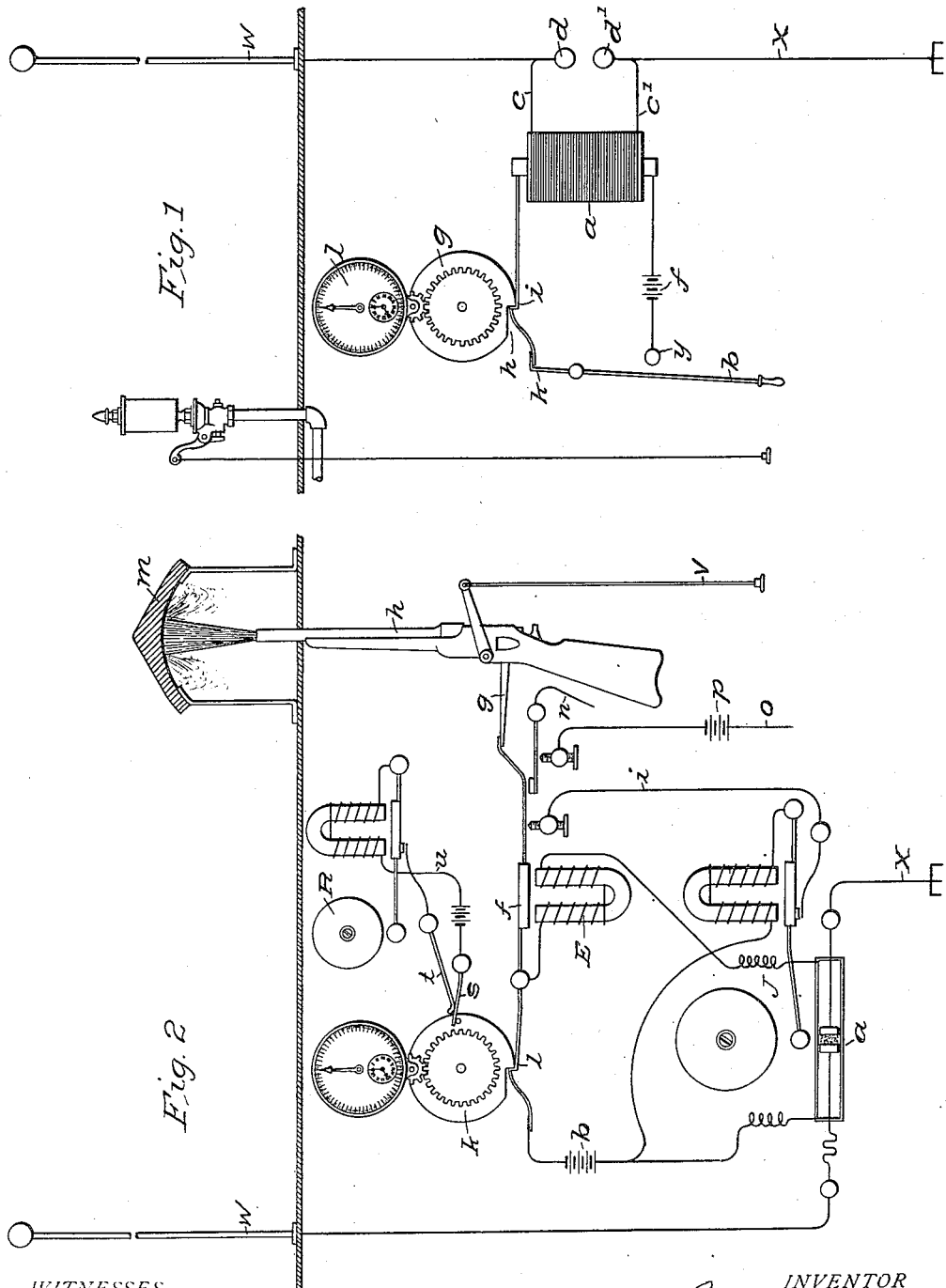

3 SHEETS—SHEET 2.

WITNESSES:
Harry W. Hahn
Chas. H. Patten

INVENTOR
John Patten
By Foster Freeman & Watson
ATTORNEYS

No. 802,020. PATENTED OCT. 17, 1905.
J. PATTEN.
FOG DISTANCE SIGNALING METHOD.
APPLICATION FILED MAY 22, 1903.

3 SHEETS—SHEET 3.

UNITED STATES PATENT OFFICE.

JOHN PATTEN, OF NEW YORK, N. Y.

FOG DISTANCE-SIGNALING METHOD.

No. 802,020.                    Specification of Letters Patent.                    Patented Oct. 17, 1905.

Application filed May 22, 1903. Serial No. 158,371.

*To all whom it may concern:*

Be it known that I, JOHN PATTEN, a citizen of the United States, residing at New York city, New York, have invented a certain new and useful Improvement in Fog Distance-Signaling Methods, of which the following is a specification.

The present invention relates to a new and useful method for signaling distances between moving vessels during foggy weather, which invention is principally intended for a fog-signal; and it consists of a combination of certain known apparatus and appliances by which ethereal waves, such as are used in wireless telegraphy, can be propagated in various directions from a certain point and caused to effect suitable receiving apparatus to produce a sudden explosion or other loud noise at each of several other points. These explosions at various points occurring simultaneously, the relative distance between such points can be approximately determined by noting the interval of time occurring between the explosion at one station and the report of the explosion at another.

My invention may be classed with that class of inventions known as "fog-signals," with the distinctive feature of being a distance-signal.

The principal object of my invention is to prevent collisions between moving boats or vessels and also to indicate the distance between vessels and fixed danger-points. The principal places where my invention will be used will be in the harbors of great cities, although it may be advantageously employed on the high seas and other navigable waters.

My invention depends upon and is carried out by a certain combination of ethereal and aerial waves which travel with definite velocities. The ethereal waves, also known as "Hertzian" waves or wireless telegraphy, are propagated with such a great velocity that for the range of distances used in carrying out my invention they may be considered instantaneous, while the aerial waves or the ordinary transmission of sound travel with a velocity of about one thousand feet per second.

The application of the invention for signaling purposes in a large harbor will be described in connection with the accompanying drawings, in which—

Figure 3:
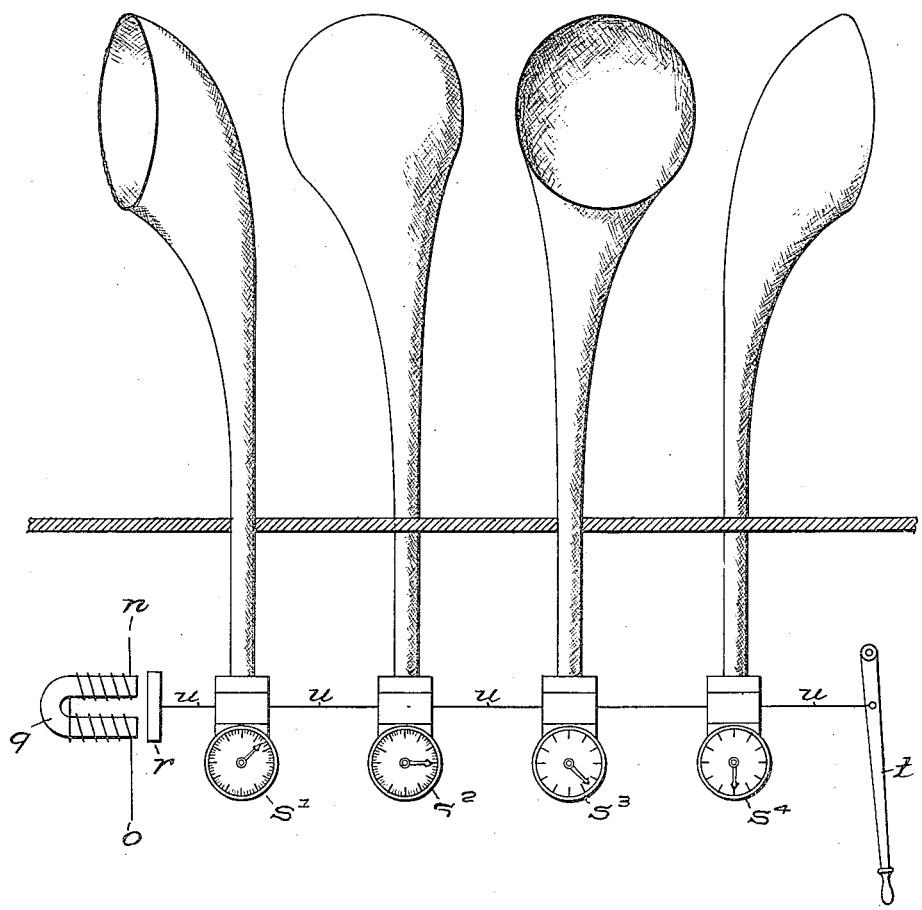
Figure 4:
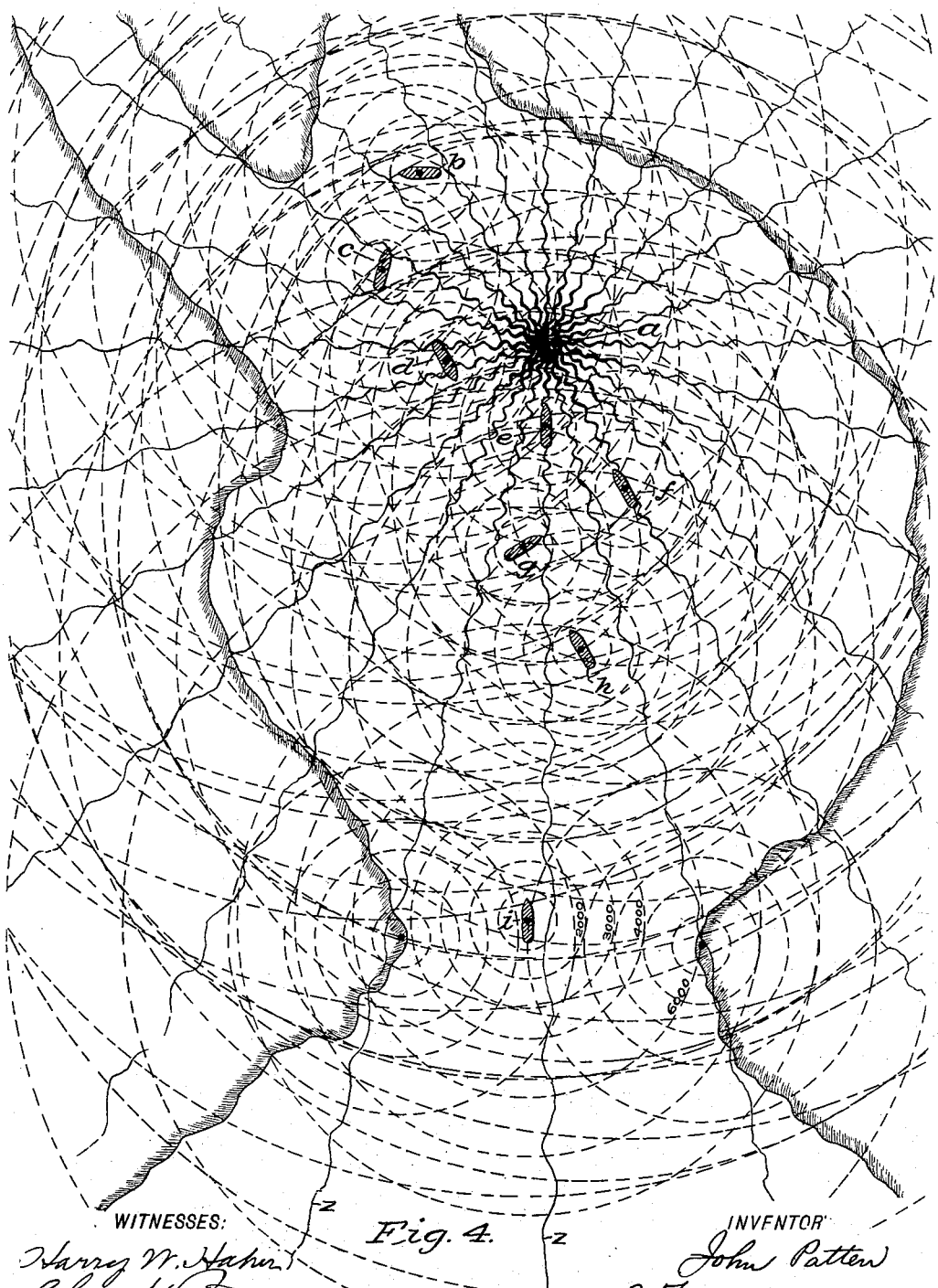

Figure 1 is a somewhat conventional illustration of an apparatus designed to produce ethereal waves. Fig. 2 is a similar view of means for receiving ethereal waves and causing an explosion. Fig. 3 illustrates a modified form of receiving apparatus. Fig. 4 is a map-like view of a harbor having therein several vessels and provided with signaling means embodying the present invention.

Referring to the drawings, and particularly to Fig. 4, *a* indicates a central station provided with apparatus for producing ethereal waves, which waves are represented in said figure by the zigzag lines *z*, and the letters *b* to *i*, inclusive, indicate a series of vessels each provided with means for receiving such ethereal waves and producing explosions, the sound-waves resulting from which are represented by circles. If the space over which the ethereal waves are to be transmitted is of such dimensions that a single station *a* would be inadequate, other similar stations may be provided, all of such stations being so connected that the production of an ethereal wave at each station will occur simultaneously with the production of a similar wave at every other station of the series. Each of the various boats will be provided with a receiving apparatus similar to that used in wireless telegraphy; but instead of operating an instrument for communicating a message the instantaneous flash of an ethereal wave is used for creating a loud noise, such as the blowing of a steam-whistle or an explosion. The latter is preferable and will be generally used. This sudden, loud, sharp, and quick noise created at each vessel is propagated in all directions with a velocity of about one thousand feet per second, which may be retarded or augmented slightly by the action of the wind, but not greatly enough to interfere with the carrying out of my invention. The explosion occurring on board of each vessel is a warning to the pilot and other officers to listen for similar noises in other directions. Should another report be heard within one second of time, it is known that the particular vessel was approximately one thousand feet from the nearest vessel similarly equipped. Two seconds interval between an explosion and the report of another explosion indicate that the vessels were separated by a distance of approximately two thousand feet; five seconds, almost a mile, and so on. Should a second report be heard immediately after an explosion has occurred, it will be considered a danger-signal, which can be used for notifying the officer to check the speed of the vessel. The direction of a vessel may also be approximately determined by the sound of such explosions; but this can be determined equally well by signals now in use, such as fog-horns.

Each vessel should be provided with a receiving apparatus of the character referred to, as it will enable them during a fog to travel much faster and with greater safety than is possible with vessels not so equipped, as they will always be warned when another vessel is in such dangerous proximity that a collision would be liable to occur.

The master of port would have control of the sending out of the ethereal waves which create a noise on each vessel, and such waves should be produced at regular and certain intervals—say every ten, twenty, or thirty seconds. If a period of twenty seconds be chosen, an interval of a few seconds should be allowed for the exclusive use of the ethereal wave which causes the explosion—that is, wireless telegraphy should not be in use by other instruments during this short interval.

Each vessel can be provided with a timepiece, which will prevent explosions from taking place except at the required intervals, and the periodic danger-waves will be sent out from the main station at certain intervals regulated by a clock or other accurate mechanism, and should any of the timepieces get out of time they can be readjusted by the attendant to correspond with the period of the distance-signal waves. Danger-signals can also be located at various fixed points from which the sound-waves can be propagated, which will indicate the distance of the vessel hearing the sound from the point of propagation.

For vessels on the high seas or lakes each one must be provided with both a propagating and a receiving apparatus, and when one vessel sends out a signaling distance wave an explosion will be created instantaneously by its receiving instrument, (which will always be left in condition to receive a message,) so that an explosion on the vessel on which the ethereal wave is produced will occur simultaneously with that on every other vessel within the radius of said wave and the distance of each vessel from the others will be determined by the length of the interval of time occurring between the explosion thereon and the reports of the explosions on the other vessels.

Any suitable ethereal-wave-producing apparatus may be employed, one form of such an apparatus being conventionally illustrated in Fig. 1, referring to which it will be seen to comprise two spheres $d$ $d'$, both connected with a coil $a$ and respectively with the vertical wire $w$ and ground-wire $x$. The coil $a$ is included in an electric circuit containing a battery or source of electric energy $f$, conductors $i$ $y$, and a circuit-closer or switch $b$, which latter may be an ordinary "Morse key." The conductor $i$ is made in the form of a spring or yielding pawl, with which coöperates a notched wheel or disk $g$, adapted to be rotated by a suitable clock mechanism $l$.

When the switch $b$ is closed, the coil $a$ will be energized, provided the notch in the wheel $g$ is in such position relative to the pawl $i$ that the latter can move therein and contact with the section $k$ of the switch, and whenever the circuit is so closed an ethereal wave will be produced by the apparatus. By closing the switch $b$ against the conductor $y$ such a wave will be produced at regular intervals, determined by the speed of revolution of the disk $g$, without attention from the attendant. If, however, it is desired to produce such waves at other than regular intervals of time, the disk $g$ will be disconnected from the clock mechanism or the latter stopped, and then the electric circuit can be closed by means of the switch $b$ whenever desired.

The receiving apparatus of my invention will be very simple, its function being to operate mechanism which will cause a noise. To produce this noise, I prefer to use a gun, pistol, small cannon, or other firing apparatus which can be quickly loaded and whose charges come prepared in cartridges supplied with percussion-caps. If I use an ordinary magazine-gun, it will be loaded and the hammer drawn back by the operator or by a spring or other mechanism which furnishes the power. The receiving apparatus will be so connected with the trigger of this gun that when an ethereal wave is received by it a current of electricity is caused to excite an electromagnet which draws an armature toward it, thereby pulling the gun-trigger attached thereto and producing an explosion. The apparatus which operates the loading mechanism will be so arranged that the gun will immediately be reloaded, usually automatically, the hammer raised, and made ready for another explosion. Ordinarily I will have the loading mechanism of this firearm in the pilot-house, the muzzle projecting upwardly through the roof. In order to get an extra loud explosion, it may be necessary to use a bullet of metal or other material, and to prevent throwing these at random in the air I propose to place an impenetrable shield or umbrella, of metal or other suitable material, over the muzzle, which will catch the bullet and cause it to fall, while the sound being propagated above the deck of the vessel is free to travel in all directions. I prefer to use a noise caused by an explosion in this way, first, because it can be made as loud as desirable and so as to be heard at a long distance; second, because it is quick and short; third, because it is positive in its action; fourth, because the charges for the gun can be prepared at a factory where proper facilities are at hand; fifth, because it is simple and not liable to get out of order. The umbrella over the muzzle will also protect the interior of the gun from water, which might cause it to rust.

In practice my invention can be carried out without the use of instruments to register the interval of time between the explosion and report, as the principal object is to determine approximately how near the vessels are to each other and whether or not there is danger of a collision.

When an explosion occurs aboard a vessel, not only the pilot, officers, and crew, but also the passengers will hear it and note the interval of time between it and the report of the nearest one to it. An experienced ear can make an approximate estimation of a tenth of a second, which would indicate about one hundred feet. The ordinary observer can estimate one-fourth of a second, which would indicate two hundred and fifty feet, while half a second, easily recognized by all, would indicate a five-hundred-foot distance, which would be sufficiently close to lessen the speed and proceed with caution, and during the interval between explosions the vessels can signal between each other in the ordinary ways—that is, by fog-horns or wireless telegraphy.

The receiving apparatus is particularly illustrated in Fig. 2, and its operation is as follows: When the ethereal wave strikes the vertical wire $w$, it travels through the coherer $a$ into the grounded wire $x$, which sensitizes the coherer so that it becomes a conductor and allows the battery $b$ to energize the electromagnet $e$, which instantly draws the armature $f$ to it, thereby pulling the trigger $g$ of the gun $h$, causing an explosion, or rather the shot to be fired. Simultaneously with the firing of the shot the armature connects with the wire $i$, which energizes the electric bell and coherer tapping arrangement $j$, thereby making the coherer a non-conductor. The clock-driven wheel $k$ is revolved in unison with the wheel $g$ of the ethereal-wave-propagating apparatus. The pawl $l$ will fall in and close the connection a little before the electric wave is propagated from the central station, and during the few seconds of time that may be required, which will cover the limit error between the various timepieces, wireless telegraphy in the harbor with other instruments should be discontinued to prevent the firing of the guns out of time. This should not necessarily require more than a few seconds, when the signal explosion will take place, and during the succeeding silent interval of twenty or thirty seconds, or until the next signal is to be given, other wireless-telegraphy apparatus may be used, the timepieces protecting the receiving apparatus from firing the signal at an improper time. When a vessel equipped with such apparatus is anchored at the wharf or in clear weather out of danger, the signaling devices can be disconnected, so as not to create unnecessary confusion through the firing of so many signals.

R is an alarm-bell, which will ring a few seconds before the signal-shot is fired. The object of this bell is to notify the officer to avoid blowing a whistle while the signals are being fired. This alarm-bell R is rung from a clock-driven wheel $k$, which has a pin engaging the spring $s$, which forms a contact with the wire $t$, thereby forming a circuit which allows the battery $u$ to energize the electric bell R, thereby ringing the alarm.

The gun $h$ herein shown is of the Winchester pattern, the magazine of which can be filled from time to time by an attendant. After an alarm-shot has been fired the operator will pull the rod $v$ down and raise it again, which act will extract the shell of the exploded cartridge and reload the gun and draw back the hammer ready for firing again by the electric apparatus, as before described.

Ordinarily blank cartridges can be used for firing the signals; but when it is necessary to use a bullet or some other projectile to offer resistance for the purpose of intensifying the sound the umbrella or obstruction $m$ will arrest the projectile and cause it to fall to the deck of the boat, while the sound will be propagated laterally. The muzzle of the gun and the wires should be placed above the roof of the cabin, pilot-house, or highest portion of the deck, so the sound may be propagated and received without obstruction. From this it can be readily seen that the officers of each boat when hearing the report from another boat can approximately determine the distance. During the interval between the distance-signals the ordinary fog-horn or other signals now in general use can be used to enable the officers to determine approximately the direction of the sound, and by a certain code of signals they can indicate the direction of their course and other messages, &c.; but when the time comes for the periodic distance-signals to be sent out the fog-horns and other such signals should be silenced and for a few seconds the distance-signals be given the right of way. When an officer or passenger on board a vessel wishes to know with reasonable accuracy the distance of another sound, it can be ascertained by the ordinary stop-watch.

The form of receiving apparatus illustrated in Fig. 3 includes a plurality of megaphones arranged with their mouths pointing in different directions and each having a diaphragm therein adapted to stop the action of a clock mechanism. Said clock mechanisms, one for each megaphone, are normally out of action, but will be started whenever through the action of an ethereal wave on the conductors $n$ $o$ the magnet $q$ is energized and the armature $r$ attracted thereto. Said armature is connected with the several clock mechanisms $S'$, $S^2$, $S^3$, and $S^4$ by a rod $u$, which is also connected to a lever $t$, by which the indicators of the clock mechanisms may be restored to normal zero position. Said clock mechanisms will be started, as aforesaid, by the ethereal wave, and when a sound-wave reaches either megaphone the clock mechanism associated therewith will be stopped, the interval of time between such actions being shown by the indicator.

Having thus described the invention, what is claimed is—

1. The herein-described method of determining the distance between two points, consisting in simultaneously producing explosions or loud noises at the two points, and then noting, at either point, the interval elapsing between the time of explosion and the arrival at that point of the sound-wave produced by the explosion at the other point.

2. The herein-described method of determining the distance between two points, consisting in simultaneously producing, by means of an ethereal wave, explosions or loud noises at the two points, and then noting, at either point, the interval elapsing between the time of explosion and the arrival at that point of sound-wave produced by the explosion at the other point.

3. The herein-described method of determining the distance between two points, consisting in simultaneously firing guns located at said points, and then noting, at either point, the interval elapsing between the time of such firing and the arrival at that point of the sound-wave from the firing at the other point.

4. The herein-described method of determining distances between separated objects, consisting in simultaneously producing at both objects, by means of an ethereal wave generated at a point independent of said objects, an explosion, or loud noise, and then noting at either object the interval elapsing between the time of explosion and the arrival at the point of sound-wave from the other explosion.

5. The herein-described method of signaling the distance between separated objects each provided with means for receiving an ethereal wave and producing, on the receipt of such a wave, an explosion, or loud noise, consisting in transmitting ethereal waves over the area including said objects at regular intervals, and noting at either object the interval of time elapsing between the explosion at that object and the arrival of sound-wave from other explosions produced by the same ethereal wave, substantially as described.

6. The herein-described method of signaling the distance between separated objects consisting in providing each object with means for receiving an ethereal wave and means controlled by such a wave for producing an explosion, or loud noise, transmitting an ethereal wave over the area including said objects, and noting at either object the interval of time elapsing between the explosion at that object and the arrival of sound-wave from other explosions produced by the same ethereal wave.

In testimony whereof I have signed my name to this specification, in the presence of two subscribing witnesses, this 21st day of May, 1903.

JOHN PATTEN.

Witnesses:
HARRY W. HAHN,
CHAS. H. PATTEN.